(12) United States Patent
Hata

(10) Patent No.: US 12,109,841 B2
(45) Date of Patent: Oct. 8, 2024

(54) BEARING DEVICE FOR VEHICLE WHEEL

(71) Applicant: NTN Corporation, Osaka (JP)

(72) Inventor: Yuusuke Hata, Iwata (JP)

(73) Assignee: NTN CORPORATION, Osaka (JP)

( * ) Notice: Subject to any disclaimer, the term of this patent is extended or adjusted under 35 U.S.C. 154(b) by 70 days.

(21) Appl. No.: 17/424,236

(22) PCT Filed: Jan. 23, 2020

(86) PCT No.: PCT/JP2020/002268
§ 371 (c)(1),
(2) Date: Jul. 20, 2021

(87) PCT Pub. No.: WO2020/153419
PCT Pub. Date: Jul. 30, 2020

(65) Prior Publication Data
US 2022/0065289 A1 Mar. 3, 2022

(30) Foreign Application Priority Data

Jan. 25, 2019 (JP) ................................. 2019-011471

(51) Int. Cl.
*B60B 27/00* (2006.01)
*F16C 19/08* (2006.01)
(Continued)

(52) U.S. Cl.
CPC .......... *B60B 27/0073* (2013.01); *F16C 19/08* (2013.01); *F16C 19/186* (2013.01);
(Continued)

(58) Field of Classification Search
CPC ...... F16C 19/08; F16C 19/186; F16C 33/586; F16C 33/80; F16C 33/805; F16C 2326/02; F16C 33/7876; B60B 27/0073
See application file for complete search history.

(56) References Cited

U.S. PATENT DOCUMENTS 8,905,641 B2    12/2014  Duch et al.
2012/0243818 A1*  9/2012  Takimoto .............. F16C 41/007
                                                    384/589
(Continued)

FOREIGN PATENT DOCUMENTS

JP     2003-240003    8/2003
JP     2006-137297    6/2006
(Continued)

OTHER PUBLICATIONS

Machine Translation of JP 2003-240003 (Year: 2003).*
(Continued)

*Primary Examiner* — Alan B Waits
(74) *Attorney, Agent, or Firm* — Wenderoth, Lind & Ponack, L.L.P.

(57) ABSTRACT

A bearing device for a vehicle wheel includes: an outer member having a plurality of rows of outer raceway surfaces; an inner member including a hub ring and an inner ring and having a plurality of rows of inner raceway surfaces; a plurality of rows of rolling members interposed between raceway surfaces of the outer member and the inner member; and an outer-side seal member that blocks an outer-side opening end of an annular space formed by the outer member and the inner member, wherein an annular recess around a rotation axis of the hub ring is provided in an inner-side base end portion of a vehicle wheel mounting flange in the hub ring, and an outer-side end portion of the outer member is inserted into the recess, and at least a part of the outer-side seal member is accommodated in the recess.

4 Claims, 6 Drawing Sheets

(51) Int. Cl.
    *F16C 19/18*     (2006.01)
    *F16C 33/78*     (2006.01)
    *F16C 33/80*     (2006.01)

(52) U.S. Cl.
    CPC ........ *F16C 33/7876* (2013.01); *F16C 33/805* (2013.01); *F16C 2326/02* (2013.01)

(56) References Cited

U.S. PATENT DOCUMENTS

| | | |
|---|---|---|
| 2014/0037239 A1 | 2/2014 | Duch et al. |
| 2018/0195552 A1* | 7/2018 | Albl ..................... F16C 19/182 |
| 2021/0164519 A1* | 6/2021 | Niebling ................ F16J 15/447 |

FOREIGN PATENT DOCUMENTS

| | | | |
|---|---|---|---|
| JP | 2009-202830 | | 9/2009 |
| JP | 2010065800 A * | 3/2010 | .......... F16C 33/7876 |
| JP | 2015-148253 | | 8/2015 |
| JP | 2016-003709 | | 1/2016 |
| JP | 2017-145881 | | 8/2017 |
| KR | 10-2013-0087855 | | 8/2013 |

OTHER PUBLICATIONS

Machine Translation of JP-2010065800-A (Year: 2010).*
International Search Report issued Mar. 24, 2020 in International (PCT) Application No. PCT/JP2020/002268.
Notice of Reasons for Refusal issued Jan. 17, 2023 in corresponding Japanese Patent Application No. 2019-011471 with English translation.

* cited by examiner

BEARING DEVICE FOR VEHICLE WHEEL

TECHNICAL FIELD

The present invention relates to a bearing device for a vehicle wheel.

BACKGROUND ART

A bearing device for a vehicle wheel that rotatably supports a wheel is known (see Patent Literature 1). In the bearing device for a vehicle wheel, an inner member is disposed on the inner side of an outer member, and a rolling member is interposed between raceway surfaces of the outer member and the inner member. In this way, the bearing device for a vehicle wheel constitutes a rolling bearing structure, and makes a wheel attached to the inner member be rotatable.

An annular space is formed between the outer member and the inner member of the bearing device for a vehicle wheel, and a seal member that blocks an outer-side opening end of the annular space is provided (see FIG. 6). In such a bearing device for a vehicle wheel, it is necessary to allow a space for accommodating the seal member on the inner side of the outer member, and as a result, there has been a problem that a relative distance between the rolling member on the inner side and the rolling member on the outer side is shortened. Therefore, there has been a problem that the rigidity against the bending moment is lowered, and the bearing life is shortened.

In addition, a vehicle wheel mounting flange is formed on a hub ring constituting the inner member (see FIG. 6). Then, the vehicle wheel mounting flange is disposed with a gap between the vehicle wheel mounting flange and an outer-side end portion of the outer member. In such a bearing device for a wheel, there has been a problem that muddy water flowing on the vehicle wheel mounting flange and muddy water flowing on the outer member reach the seal member through the gap, and the seal member bites a foreign matter contained in the muddy water and is damaged or worn. Therefore, there has been a problem that the sealing property of the seal member is deteriorated.

CITATIONS LIST

Patent Literature

Patent Literature 1: JP-A 2017-145881 Gazette

SUMMARY OF INVENTION

Technical Problems

Provided is a bearing device for a vehicle wheel capable of improving the bearing life, by increasing the rigidity against the bending moment and suppressing lowering in the sealing performance of the outer-side seal member.

Solutions to Problems

In a bearing device for a vehicle wheel of the present invention including:
an outer member having a plurality of rows of outer raceway surfaces;
an inner member including a hub ring and an inner ring and having a plurality of rows of inner raceway surfaces;
a plurality of rows of rolling members interposed between raceway surfaces of the outer member and the inner member; and
an outer-side seal member that blocks an outer-side opening end of an annular space formed by the outer member and the inner member,
an annular recess around a rotation axis of the hub ring is preferably provided in an inner-side base end portion of a vehicle wheel mounting flange in the hub ring, and
an outer-side end portion of the outer member is preferably inserted into the recess, and at least a part of the outer-side seal member is preferably accommodated in the recess.

In the bearing device for a vehicle wheel of the present invention, an inner peripheral surface of the recess and an outer peripheral surface in an outer-side end portion of the outer member are close to each other to form a labyrinth portion.

In the bearing device for a vehicle wheel of the present invention, the labyrinth portion is more inclined radially outward toward an inner side.

Advantageous Effects of Invention

As advantageous effects of the present invention, effects described below are obtained.

According to the bearing device for a vehicle wheel of the present invention, an annular recess around a rotation axis of a hub ring is provided in an inner-side base end portion of a vehicle wheel mounting flange of the hub ring. An outer-side end portion of an outer member is inserted into the recess, and at least a part of an outer-side seal member is accommodated in the recess. According to the bearing device for a vehicle wheel, since the outer member can be expanded in the axial direction and a space for accommodating the outer-side seal member can be allowed on the inner side of the outer member, a relative distance between a rolling member on the inner side and a rolling member on the outer side can be made long. Therefore, since the rigidity against the bending moment is increased, the bearing life can be improved. Further, according to the bearing device for a vehicle wheel, since a gap formed by the inner-side base end portion of the vehicle wheel mounting flange and the outer-side end portion of the outer member is complicated, muddy water flowing on the vehicle wheel mounting flange and muddy water flowing on the outer member can be prevented from reaching the outer-side seal member. Therefore, since lowering in the sealing property of the outer-side seal member can be suppressed, the bearing life can be improved.

According to the bearing device for a vehicle wheel of the present invention, an inner peripheral surface of the recess and an outer peripheral surface in the outer-side end portion of the outer member are close to each other to form a labyrinth portion. According to the bearing device for a vehicle wheel, even if muddy water enters the labyrinth portion, it is possible to prevent the muddy water from passing through the labyrinth portion and reaching the outer-side seal member. Therefore, since lowering in the sealing property of the outer-side seal member can be suppressed, the bearing life can be improved.

According to the bearing device for a vehicle wheel of the present invention, the labyrinth portion is more inclined radially outward toward the inner side. According to the bearing device for a vehicle wheel, even if muddy water enters the labyrinth portion, the muddy water can be discharged using a centrifugal force generated by the rotation of the hub ring. Therefore, lowering in the sealing property of the outer-side seal member can be further suppressed.

DESCRIPTION OF EMBODIMENTS

Figure 1:
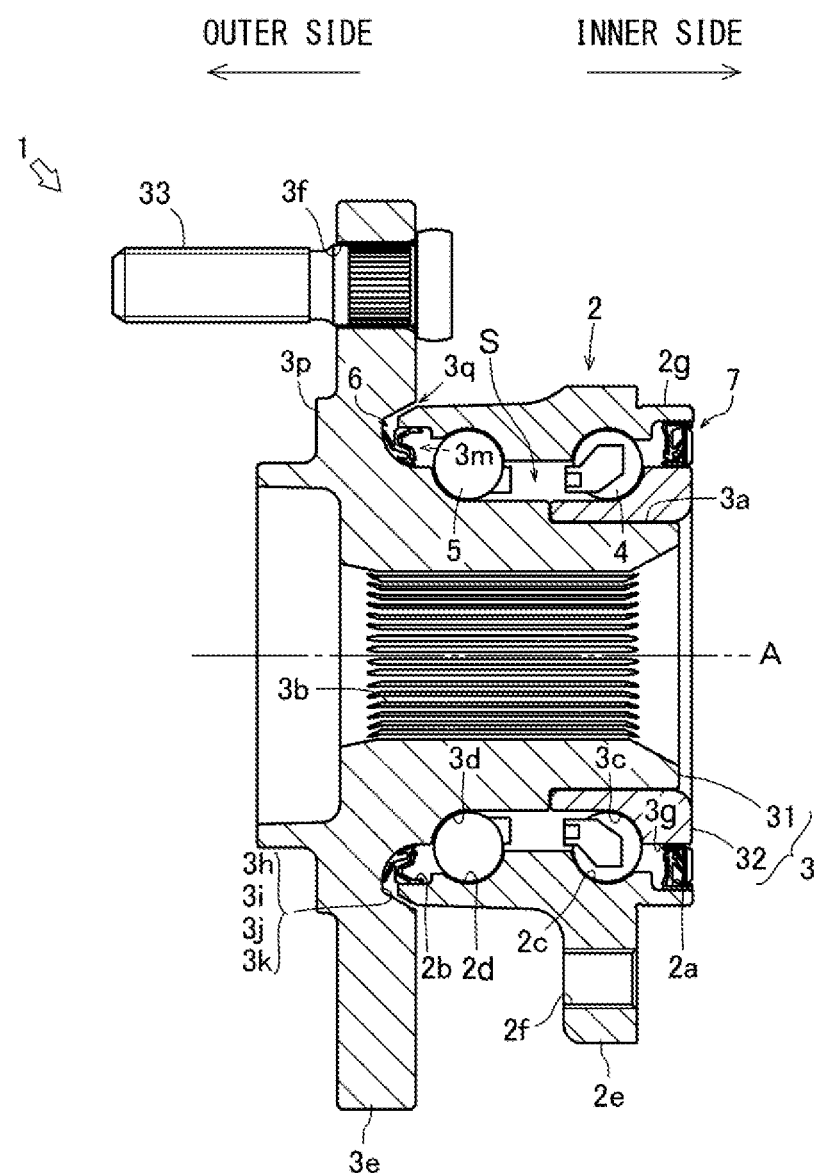
FIG. 1 is a diagram showing a structure of a bearing device for a vehicle wheel.

First, a structure of a bearing device for a vehicle wheel 1 will be described with reference to FIG. 1.

The bearing device for a vehicle wheel 1 rotatably supports a wheel. The bearing device for a vehicle wheel 1 includes an outer member 2, an inner member 3, and rolling members 4 and 5. Note that, as used herein, "inner side" represents the vehicle body side of the bearing device for a vehicle wheel 1 when attached to a vehicle body, and "outer side" represents the wheel side of the bearing device for a vehicle wheel 1 when attached to the vehicle body. Further, "radially outward" represents a direction away from a rotation axis A of the inner member 3, and "radially inward" represents a direction approaching the rotation axis A of the inner member 3. Furthermore, "axial direction" represents a direction along the rotation axis A.

The outer member 2 constitutes an outer ring portion of the rolling bearing structure. A fitting surface 2a is formed on the inner periphery of an inner side end portion of the outer member 2. Further, a fitting surface 2b is formed on the inner periphery of an outer side end portion of the outer member 2. Furthermore, two outer raceway surfaces 2c and 2d are formed on the inner periphery of an axially central portion of the outer member 2. In addition, a vehicle body mounting flange 2e extending radially outward from an outer peripheral surface of the outer member 2 is formed on the outer member 2. The vehicle body mounting flange 2e is provided with a plurality of bolt holes 2f.

The inner member 3 constitutes an inner ring portion of the rolling bearing structure. The inner member 3 includes a hub ring 31 and an inner ring 32.

The hub ring 31 is disposed radially inward the outer member 2. A small diameter step portion 3a is formed up to an axial central portion on the outer periphery of an inner side end portion of the hub ring 31. The small diameter step portion 3a refers to a portion where the outer diameter of the hub ring 31 is reduced, and an outer peripheral surface of the small diameter step portion 3a has a cylindrical shape around the rotation axis A. Further, a spline hole 3b penetrating from an inner side end portion of the hub ring 31 to an outer side end portion is formed on the hub ring 31. Furthermore, an inner raceway surface 3d is formed on the outer periphery of an axial central portion of the hub ring 31. In addition, a vehicle wheel mounting flange 3e extending radially outward from an outer peripheral surface of the hub ring 31 is formed on the hub ring 31. The vehicle wheel mounting flange 3e is provided with a plurality of bolt holes 3f around the rotation axis A, and a hub bolt 33 is press-fitted into each of the bolt holes 3f.

The inner ring 32 is externally fitted to the small diameter step portion 3a of the hub ring 31. A fitting surface 3g is formed on the outer periphery of an inner side end portion of the inner ring 32. Further, an inner raceway surface 3c is formed on the outer periphery adjacent to the fitting surface 3g. In this manner, the inner raceway surface 3c is formed on the outer periphery of the inner ring 32.

The rolling members 4 and 5 constitute a rolling portion of the rolling bearing structure. The rolling members 4 and 5 are what is called steel balls, and are arranged at equal intervals on the circumference by a cage. The rolling member 4 on the inner side is interposed between the outer raceway surface 2c of the outer member 2 and the inner raceway surface 3c of the inner ring 32. Further, the rolling member 5 on the outer side is interposed between the outer raceway surface 2d of the outer member 2 and the inner raceway surface 3d of the hub ring 31. Note that, in the present bearing device for a vehicle wheel 1, the rolling members 4 and 5 are both spherical. However, one or both of the rolling members 4 and 5 may be cylindrical or conical.

Figure 2:
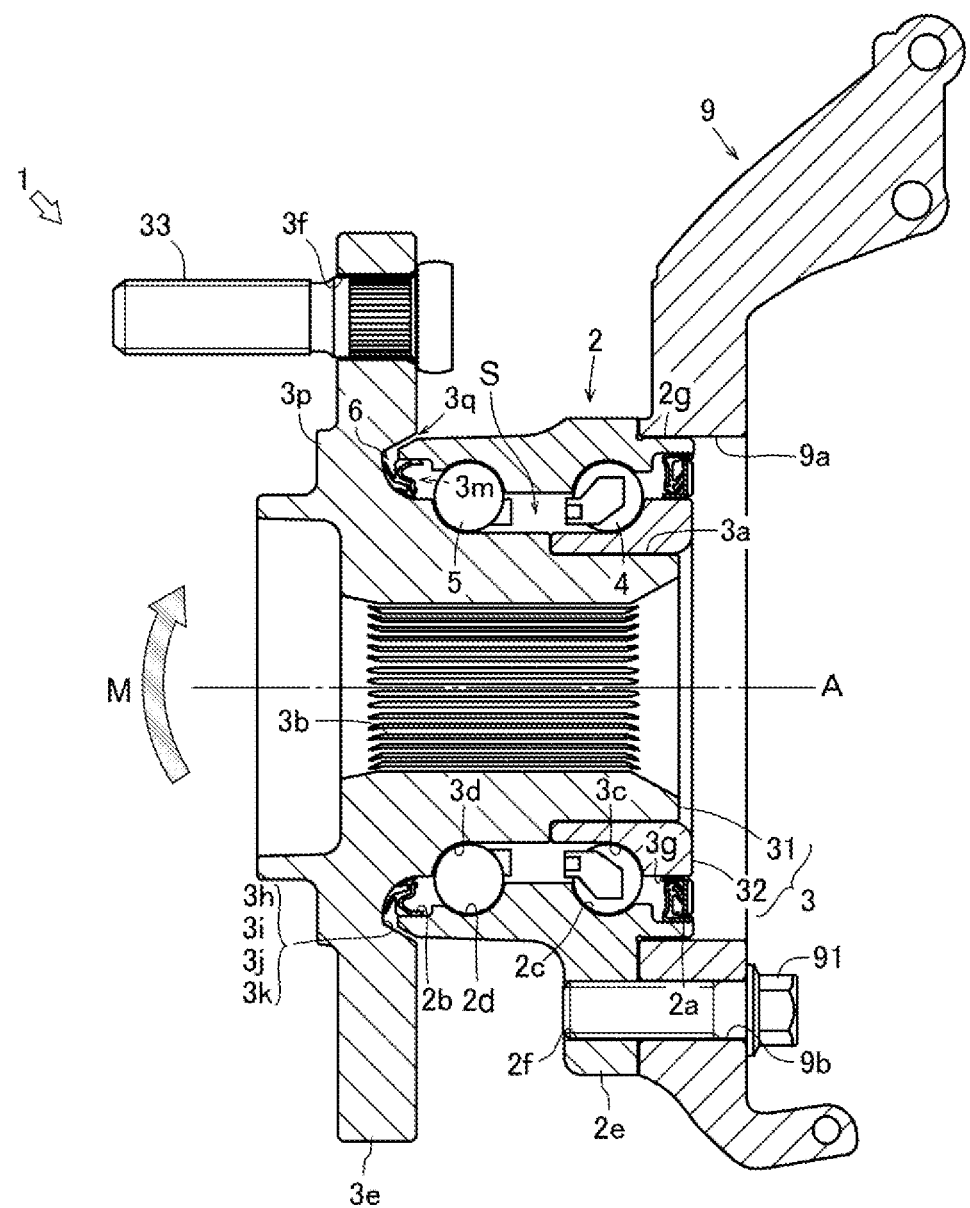
FIG. 2 is a diagram showing a state in which the bearing device for a vehicle wheel is attached to a vehicle body.

Next, a structure for attaching the bearing device for a vehicle wheel 1 to a vehicle body will be described with reference to FIG. 2.

The bearing device for a vehicle wheel 1 is attached with a knuckle bolt 91 in a state where a pilot portion 2g having a cylindrical shape is fitted into a fitting hole 9a of a knuckle 9 and an end surface of the vehicle body mounting flange 2e is made abutting on an end surface of the knuckle 9. At this time, the knuckle bolt 91 is inserted into a bolt hole 9b of the knuckle 9 from the inner side, and is screwed into the bolt hole 2f of the vehicle body mounting flange 2e. Alternatively, the knuckle bolt 91 is inserted into the bolt hole 2f of the vehicle body mounting flange 2e from the outer side, and screwed into the bolt hole 9b of the knuckle 9. Note that a bending moment M acts on the inner member 3 when the vehicle body turns, when a wheel moves over the unevenness, or the like.

Figure 3:
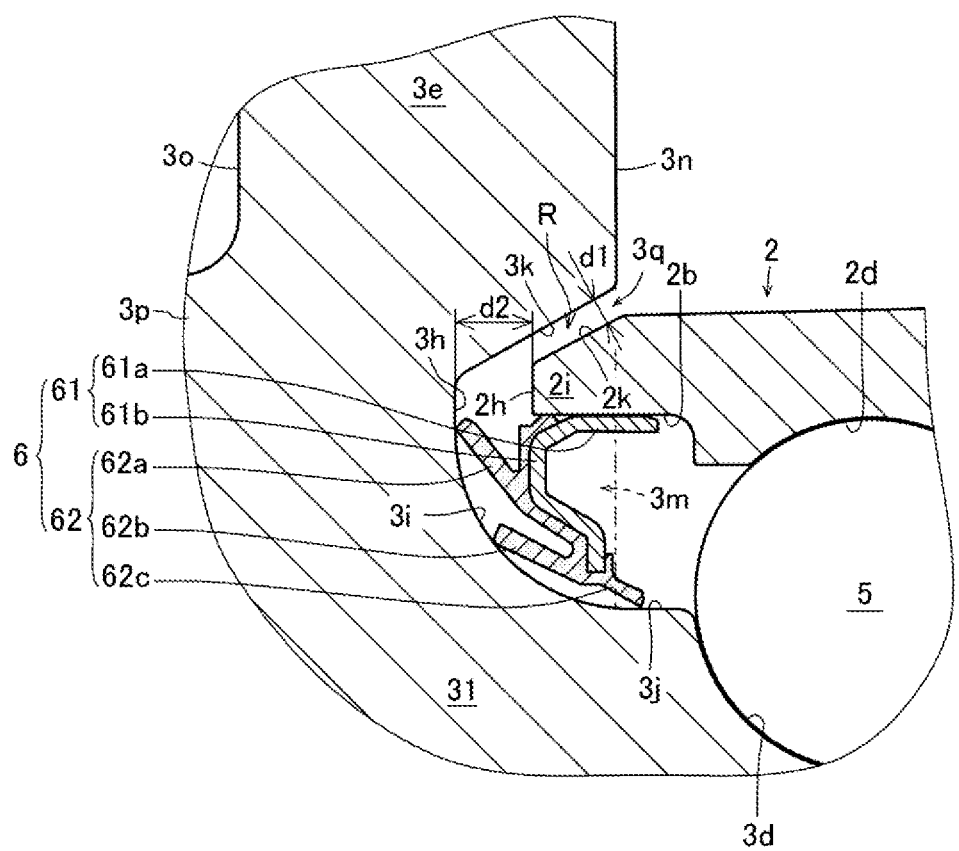
FIG. 3 is a diagram showing a partial structure of the bearing device for a vehicle wheel according to a first embodiment.
Figure 4:
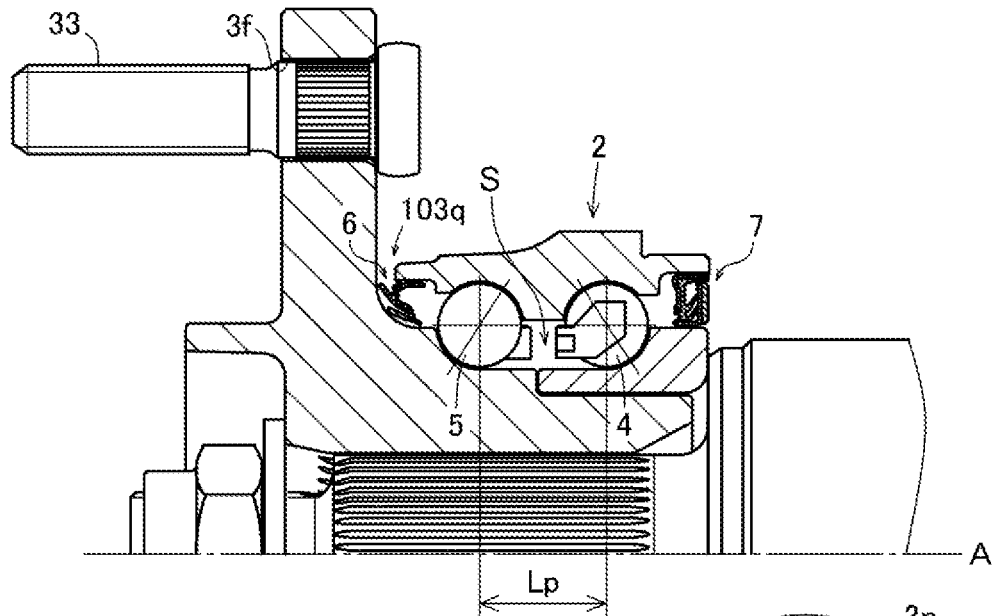
FIG. 4 is a diagram showing features of the bearing device for a vehicle wheel according to the first embodiment.
Figure 4:
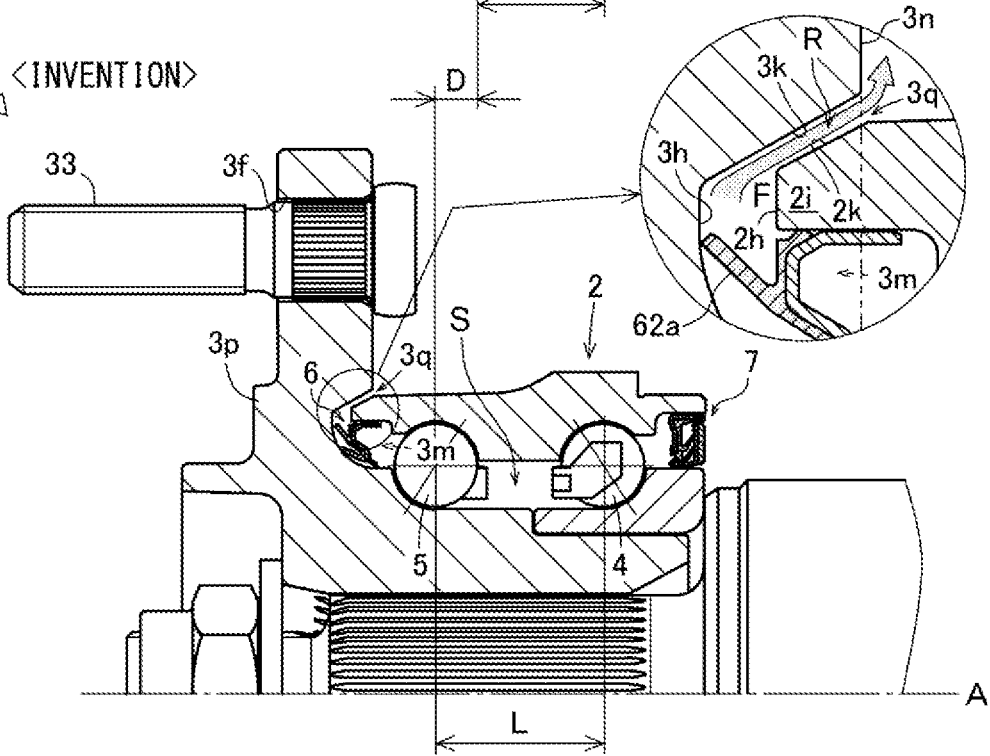

Next, features and of the bearing device for a vehicle wheel 1 according to the first embodiment and effects of the features will be described with reference to FIGS. 3 and 4. FIG. 4 shows a bearing device for a vehicle wheel which is a conventional product for comparison. Here, in the bearing device for a vehicle wheel which is a conventional product, the same members are denoted by the same reference numerals.

First, a seal member 6 constituting the bearing device for a vehicle wheel 1 will be described. The bearing device for a vehicle wheel 1 includes a pair of seal members 6 and 7 to block both side opening ends of an annular space S formed between the outer member 2 and the inner member 3 (the hub ring 31 and the inner ring 32). Hereinafter, description will be made focusing on the seal member (hereinafter referred to as "outer-side seal member") 6 that blocks the outer-side opening end of the annular space S.

The outer-side seal member 6 is formed by vulcanizing and bonding an elastic member 62 to core metal 61. The core metal 61 includes a fitting portion 61a internally fitted to the fitting surface 2b of the outer member 2, and a side plate portion 61b extending radially inward from an outer-side end portion of the fitting portion 61a. A side lip 62a is formed on the elastic member 62, and a tip edge of the side lip 62a is in contact with a flat end surface 3h. Further, an intermediate lip 62b is formed radially inward the side lip 62a, and a tip edge of the intermediate lip 62b is in contact with an arcuate surface 3*i*. Furthermore, a grease lip 62*c* is formed on the elastic member 62, and a tip edge of the grease lip 62*c* is in contact with an axial peripheral surface 3*j*.

In the bearing device for a vehicle wheel 1 according to the first embodiment, an annular recess 3*m* around the rotation axis A of the hub ring 31 is provided in an inner-side base end portion of the vehicle wheel mounting flange 3*e* of the hub ring 31. The recess 3*m* is a portion recessed from an inner-side end surface 3*n* of the vehicle wheel mounting flange 3*e* toward the outer side, and a flat end surface 3*h* which is a bottom surface of the recess 3*m* is perpendicular to the rotation axis A. Further, the arcuate surface 3*i*, which is a radially inward inner peripheral surface of the recess 3*m*, is connected to the flat end surface 3*h* and the axial peripheral surface 3*j* so as to be continuous. Furthermore, the axial peripheral surface 3*j* is parallel to the rotation axis A on the outer side of the recess 3*m*. Then, polishing finish is performed for at least the flat end surface 3*h*, the arcuate surface 3*i*, and the axial peripheral surface 3*j*. Note that a reinforcing portion 3*p* protruding from an outer-side end surface 3*o* toward the outer side is provided in an outer-side base end portion of the vehicle wheel mounting flange 3*e*. This is to prevent lowering in strength due to the provision of the recess 3*m*.

At the same time, in the bearing device for a vehicle wheel 1 according to the first embodiment, an outer-side end portion 2*i* of the outer member 2 is inserted into the recess 3*m* (inserted into the recess 3*m* across the two-dot chain line in the diagram). Then, at least a part of the outer-side seal member 6 internally fitted to the outer-side end portion 2*i* of the outer member 2 is accommodated on the inner side of the recess 3*m* (accommodated on the inner side of the recess 3*m* across the two-dot chain line in the diagram). Specifically, a part including the side lip 62*a* and the intermediate lip 62*b* of the outer-side seal member 6 is accommodated in the recess 3*m*. However, a part including the grease lip 62*c* in addition to the side lip 62*a* and the intermediate lip 62*b* may be accommodated on the inner side of the recess 3*m*. In this respect, "at least a part of the outer-side seal member 6" is not limited.

As described above, in the present bearing device for a vehicle wheel 1, the outer member 2 is expanded in the axial direction as compared with the bearing device for a vehicle wheel which is a conventional product. Further, a space for accommodating the outer-side seal member 6 is allowed on the inner side of the outer member 2. For this reason, in the present bearing device for a vehicle wheel 1, a relative distance L between the rolling member 4 on the inner side and the rolling member 5 on the outer side can be made larger than a relative distance Lp of the bearing device for a vehicle wheel which is a conventional product. In FIG. 4, a difference between the relative distance L and the relative distance Lp is represented by a value D.

Furthermore, in the present bearing device for a vehicle wheel 1, a gap 3*q* formed by the inner-side base end portion of the vehicle wheel mounting flange 3*e* and the outer-side end portion 2*i* of the outer member 2 is formed along the inner peripheral surface of the recess 3*m*. For this reason, the present bearing device for a vehicle wheel 1 has a complicated shape as compared with a gap 103*q* of the bearing device for a vehicle wheel which is a conventional product. In this way, muddy water flowing on the vehicle wheel mounting flange 3*e* and muddy water flowing on the outer member 2 are less likely to enter the gap 3*q*. Further, muddy water is less likely to reach the outer-side seal member 6. In FIG. 3, the dimension from an inclined surface 3*k*, which is a radially outward inner peripheral surface of the recess 3*m*, to an outer peripheral surface 2*k* of the outer-side end portion 2*i* of the outer member 2 is represented by a value d1. The value d1 is 0.1 mm or more even when the vehicle body turns. Furthermore, the dimension from the flat end surface 3*h*, which is the bottom surface of the recess 3*m*, to an outer-side end surface 2*h* of the outer member 2 is represented by a value d2. The value d2 is 0.5 mm or more even when the vehicle body turns.

As described above, in the bearing device for a vehicle wheel 1 according to the first embodiment, the annular recess 3*m* around the rotation axis A of the hub ring 31 is provided in the inner-side base end portion of the vehicle wheel mounting flange 3*e* of the hub ring 31. Then, the outer-side end portion 2*i* of the outer member 2 is inserted into the recess 3*m*, and at least a part of the outer-side seal member 6 is accommodated in the recess 3*m*. According to the bearing device for a vehicle wheel 1, since the outer member 2 can be expanded in the axial direction and a space for accommodating the outer-side seal member 6 can be allowed on the inner side of the outer member 2, the relative distance L between the rolling member 4 on the inner side and the rolling member 5 on the outer side can be made long. Therefore, since the rigidity against the bending moment M is increased, the bearing life can be improved. Further, according to the bearing device for a vehicle wheel 1, since the gap 3*q* formed by the inner-side base end portion of the vehicle wheel mounting flange 3*e* and the outer-side end portion 2*i* of the outer member 2 is complicated, muddy water flowing on the vehicle wheel mounting flange 3*e* and muddy water flowing on the outer member 2 can be prevented from reaching the outer-side seal member 6. Therefore, since lowering in the sealing property of the outer-side seal member 6 can be suppressed, the bearing life can be improved.

In addition, in the bearing device for a vehicle wheel 1, the relative distance L between the rolling member 4 on the inner side and the rolling member 5 on the outer side can be made long. Therefore, since the rigidity against the bending moment M is increased, the bearing life can be improved.

Figure 5:
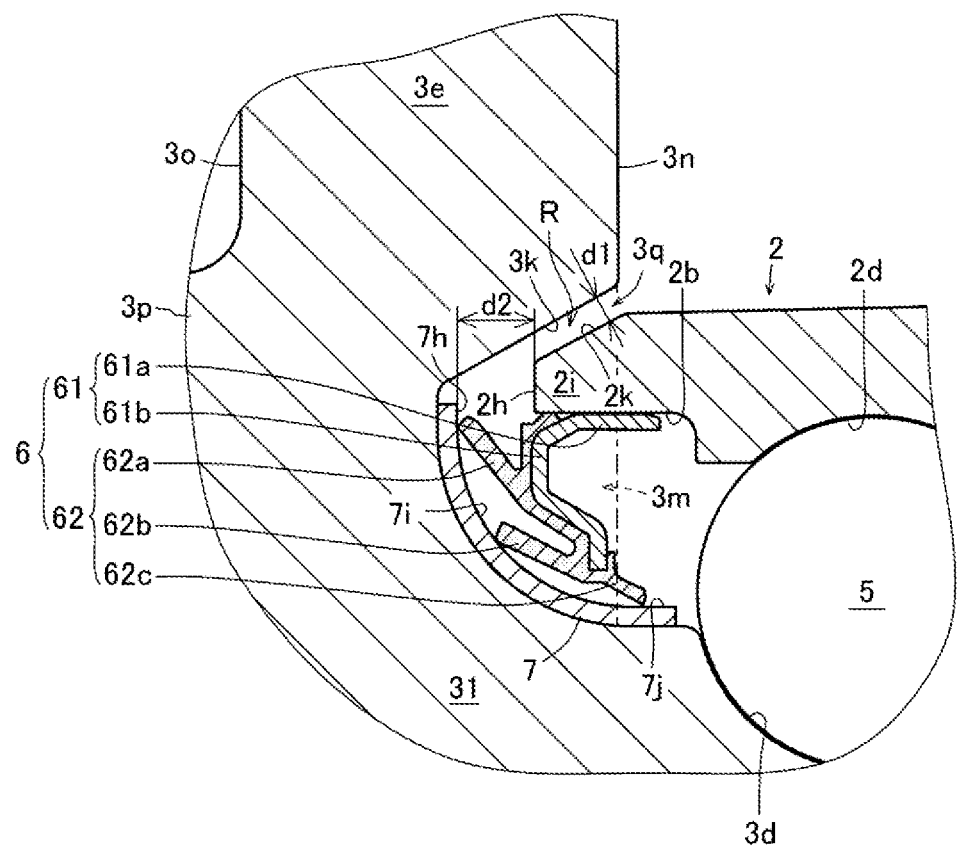
FIG. 5 is a diagram showing a partial structure of the bearing device for a vehicle wheel according to a second embodiment.
Figure 6:
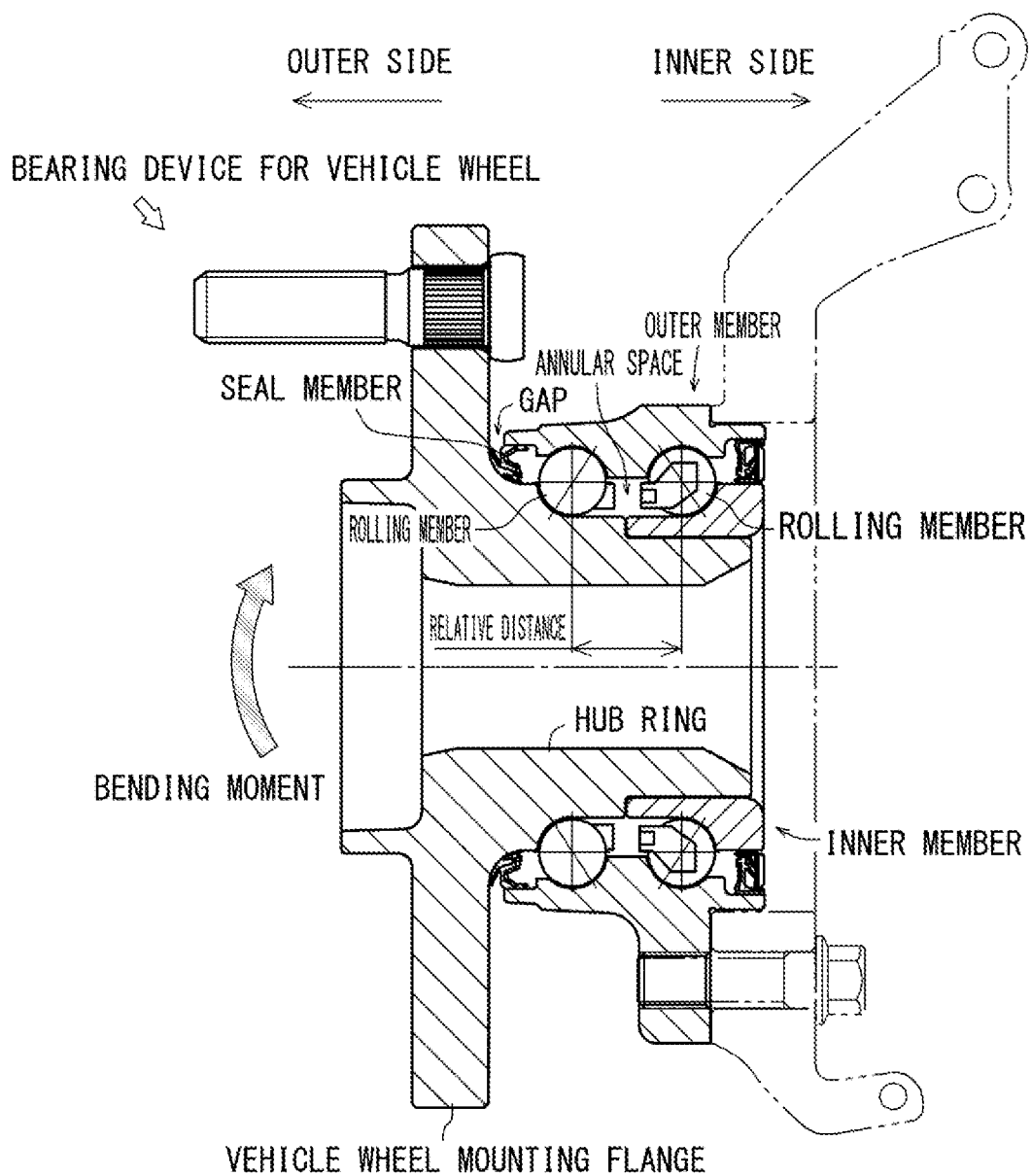
FIG. 6 is a diagram showing a structure of a bearing device for a vehicle wheel which is a conventional product.

Next, features of the bearing device for a vehicle wheel 1 according to a second embodiment and effects of the features will be described with reference to FIG. 5. Note that description will be made focusing on a different part as compared with the bearing device for a vehicle wheel 1 according to the first embodiment.

The bearing device for a vehicle wheel 1 according to the second embodiment includes a slinger 7. The slinger 7 is formed by bending a steel plate, and is fitted along the inner peripheral surface of the recess 3*m*. Then, a tip edge of the side lip 62*a* of the elastic member 62 is in contact with a flat end surface 7*h*. Further, a tip edge of the intermediate lip 62*b* of the elastic member 62 is in contact with an arcuate surface 7*i*. Furthermore, a tip edge of the grease lip 62*c* of the elastic member 62 is in contact with an axial peripheral surface 7*j*.

The bearing device for a vehicle wheel 1 according to the second embodiment also has the same function and effect as those of the bearing device for a vehicle wheel 1 according to the first embodiment.

Next, other features of the bearing device for a vehicle wheel 1 according to each embodiment and effects of the features will be described with reference to FIGS. 3 to 6.

In the bearing device for a vehicle wheel 1 according to each embodiment, a narrow gap 3*q* is formed by the inclined surface 3*k*, which is the radially outward inner peripheral surface of the recess 3*m*, and the outer peripheral surface 2*k* in the outer-side end portion 2*i* of the outer member 2. In this manner, since muddy water is collected by the narrow gap 3*q*, the muddy water is less likely to reach the outer-side seal member 6. That is, even if muddy water enters the gap 3*q*, it is possible to prevent the muddy water from passing through the gap 3*q* and reaching the outer-side seal member 6. As used herein, the gap 3*q* is defined as a "labyrinth portion R".

The labyrinth portion R has a function of discharging infiltrated muddy water. That is, the inclined surface 3*k*, which is the radially outward inner peripheral surface of the recess 3*m*, is more inclined radially outward toward the inner side. Further, the outer peripheral surface 2*k* of the outer-side end portion 2*i* of the outer member 2 is also inclined radially outward toward the inner side. Therefore, the labyrinth portion R including the inclined surface 3*k* and the outer peripheral surface 2*k* is more inclined radially outward toward the inner side. In this manner, muddy water remaining in the labyrinth portion R rotates together with the rotation of the hub ring 31. Then, a centrifugal force directed radially outward is applied to the muddy water. In this way, the muddy water is discharged to the outside from the labyrinth portion R (see an arrow F).

As described above, in the present bearing device for a vehicle wheel 1, the inner peripheral surface of the recess 3*m* and the outer peripheral surface 2*k* of the outer-side end portion 2*i* of the outer member 2 are close to each other to constitute the labyrinth portion R. According to the bearing device for a vehicle wheel 1, even if muddy water enters the labyrinth portion R, it is possible to prevent the muddy water from passing through the labyrinth portion R and reaching the outer-side seal member 6. Therefore, since lowering in the sealing property of the outer-side seal member 6 can be suppressed, the bearing life can be improved.

In addition, in the present bearing device for a vehicle wheel 1, the labyrinth portion R is more inclined radially outward toward the inner side. According to the bearing device for a vehicle wheel 1, even if muddy water enters the labyrinth portion R, the muddy water can be discharged using a centrifugal force generated by the rotation of the hub ring 31. Therefore, lowering in the sealing property of the outer-side seal member 6 can be further suppressed.

Finally, the bearing device for a vehicle wheel 1 disclosed herein has a third-generation structure in which the outer member 2 includes the vehicle body mounting flange 2*e*, and the inner member 3 includes the hub ring 31 including the vehicle wheel mounting flange 3*e* and the inner ring 32. However, the present invention is not limited to such a bearing device for vehicle wheel. For example, a second-generation structure, in which a vehicle body mounting flange is provided on an outer member, and a hub ring having a vehicle wheel mounting flange can be inserted into an inner ring which is an inner member, may be employed. Furthermore, a fourth generation structure, in which an outer member has a vehicle body mounting flange, and an inner member is a fitting body of a hub ring having a vehicle wheel mounting flange and a universal joint, may be employed.

INDUSTRIAL APPLICABILITY

The present invention is applicable to a bearing device for a vehicle wheel.

REFERENCE SIGNS LIST 1 bearing device for a vehicle wheel
2 outer member
2*c* outer raceway surface
2*d* outer raceway surface
2*i* outer-side end portion
3 inner member
3*c* inner raceway surface
3*d* inner raceway surface
3*e* vehicle wheel mounting flange
3*m* recess
3*q* gap
31 hub ring
32 inner ring
4 rolling member
5 rolling member
6 outer-side seal member
A rotation axis
R labyrinth portion
S annular space

The invention claimed is:

1. A bearing device for a vehicle wheel, the bearing device comprising:
an outer member having a plurality of rows of outer raceway surfaces;
an inner member including a hub ring and an inner ring and having a plurality of rows of inner raceway surfaces;
a plurality of rows of rolling members interposed between the outer raceway surfaces of the outer member and the inner raceway surfaces of the inner member; and
an outer-side seal member that blocks an outer-side opening end of an annular space formed by the outer member and the inner member, wherein
an annular recess around a rotation axis of the hub ring is provided at an inner-side base end portion of a vehicle wheel mounting flange of the hub ring,
the annular recess is a portion recessed from an inner-side end surface of the vehicle wheel mounting flange toward an outer side,
an outer-side end portion of the outer member is inserted into the annular recess, and at least a part of the outer-side seal member is accommodated in the annular recess,
a reinforcing portion protruding from an outer-side end surface toward the outer side is provided at an outer-side base end portion of the vehicle wheel mounting flange,
an outer diameter end of the reinforcing portion is located at an outer diameter side of an outer diameter end of an inclined surface of the hub ring, and the outer diameter end of the inclined surface of the hub ring is located at an outer diameter side of an outer diameter surface of the outer member,
a plurality of bolt holes are provided around the rotation axis of the hub ring on a radially outer portion of the vehicle wheel mounting flange, and
an outer side end portion of the outer member is located on a more outer side than inner side ends of the bolt holes and is located on a more inner side than an outer side end of the outer seal member.

2. The bearing device for a vehicle wheel according to claim 1, wherein an inner peripheral surface of the annular recess and an outer peripheral surface of an outer-side end portion of the outer member are positioned facing each other to form a labyrinth portion.

3. The bearing device for a vehicle wheel according to claim 2, wherein the labyrinth portion is inclined radially outward toward an inner side.

4. The bearing device for a vehicle wheel according to claim 1, wherein the outer diameter surface of the outer member is located at an outer side of a vehicle body mounting flange of the outer member.

* * * * *